United States Patent [19]

Dawson

[11] Patent Number: 5,379,524

[45] Date of Patent: Jan. 10, 1995

[54] VERSATILE TAPE MEASURE TOOL

[76] Inventor: Melvin Dawson, 10 N. 11th St., Wyandanch, N.Y. 11798

[21] Appl. No.: 217,728

[22] Filed: Mar. 25, 1994

[51] Int. Cl.⁶ .............................................. G01B 3/10
[52] U.S. Cl. ....................................... 33/768; 33/760; 33/770; 33/668; 33/354; 33/370; 33/333
[58] Field of Search ................ 33/768, 755, 758, 759, 33/760, 761, 762, 763, 766, 767, 769, 770, 668, 528, 333, 334, 354, 370, 377, 390; D10/72

[56] References Cited

U.S. PATENT DOCUMENTS

| | | | |
|---|---|---|---|
| 970,360 | 9/1910 | Whigham | 33/390 |
| 1,826,731 | 10/1931 | Chatham | 33/377 |
| 3,526,964 | 9/1970 | Clark, Jr. | 33/761 |
| 4,023,277 | 5/1977 | Fizer | 33/761 |
| 4,189,107 | 2/1980 | Quenot et al. | 33/761 |
| 4,700,489 | 10/1987 | Vasile | 33/760 |
| 5,060,394 | 10/1991 | Lincoln et al. | 33/761 |
| 5,079,851 | 1/1992 | Sill | 33/768 |
| 5,142,793 | 9/1992 | Crane | 33/755 |
| 5,230,159 | 7/1993 | Lipsey | 33/768 |

FOREIGN PATENT DOCUMENTS

| | | | |
|---|---|---|---|
| 0725934 | 1/1966 | Canada | 33/761 |
| 0021001 | 2/1981 | Japan | 33/760 |
| 0042401 | 2/1988 | Japan | 33/755 |
| 0205401 | 10/1923 | United Kingdom | 33/755 |

*Primary Examiner*—William A. Chuchlinski, Jr.
*Assistant Examiner*—Christopher W. Fulton
*Attorney, Agent, or Firm*—Michael I. Kroll

[57] ABSTRACT

An improved versatile tape measure tool is provided, which consists of an elongated strip of tape marked off in a linear scale for taking measurements. A casing is for storing the tape therein in a coiled spring biased condition with the tape being extendable through a first end wall of the casing for measuring. A plurality of components are built into the casing, to help in the measuring and cutting to size of plasterboard, so that the plasterboard can be used to cover interior walls and ceilings.

11 Claims, 2 Drawing Sheets

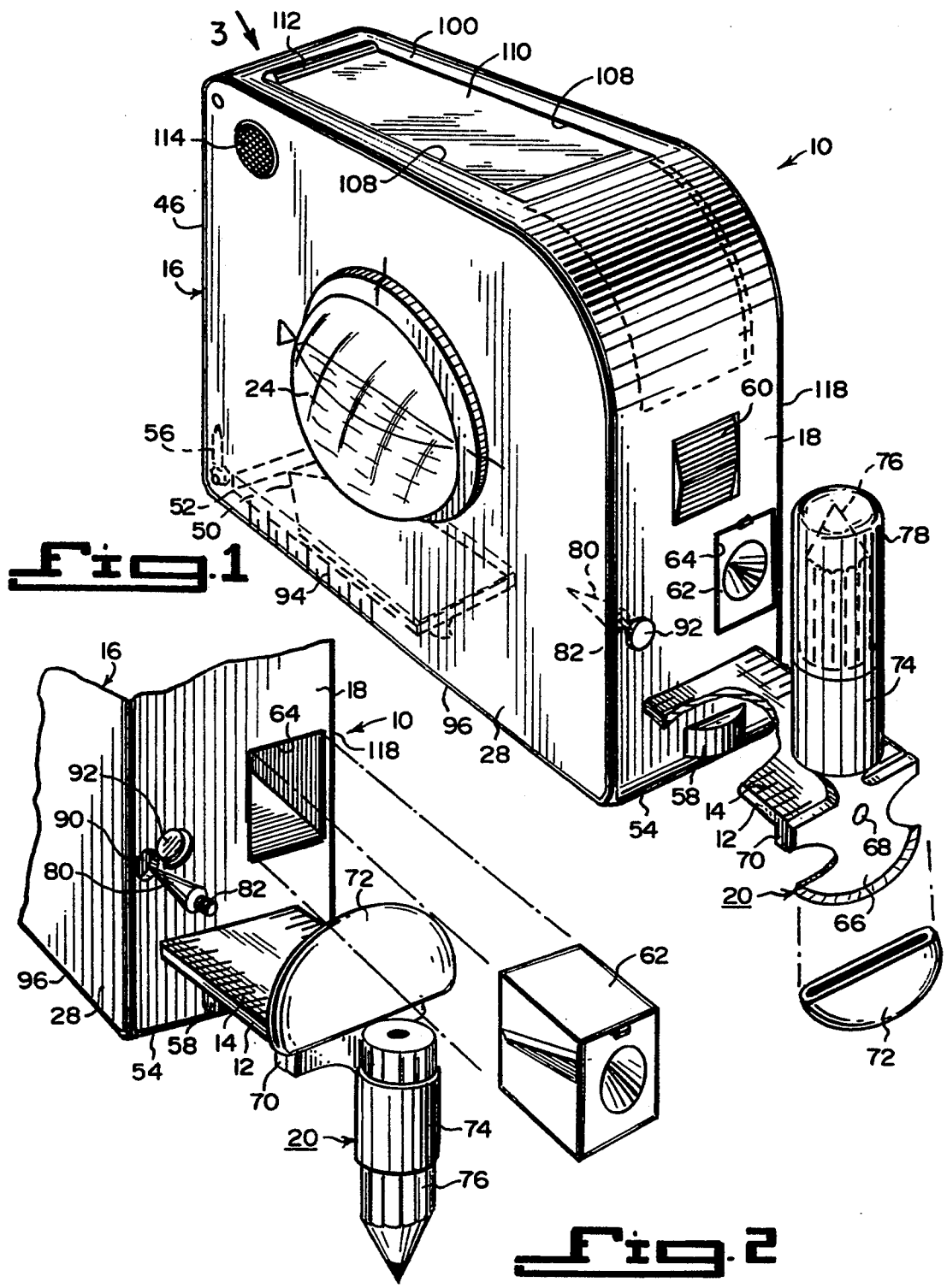

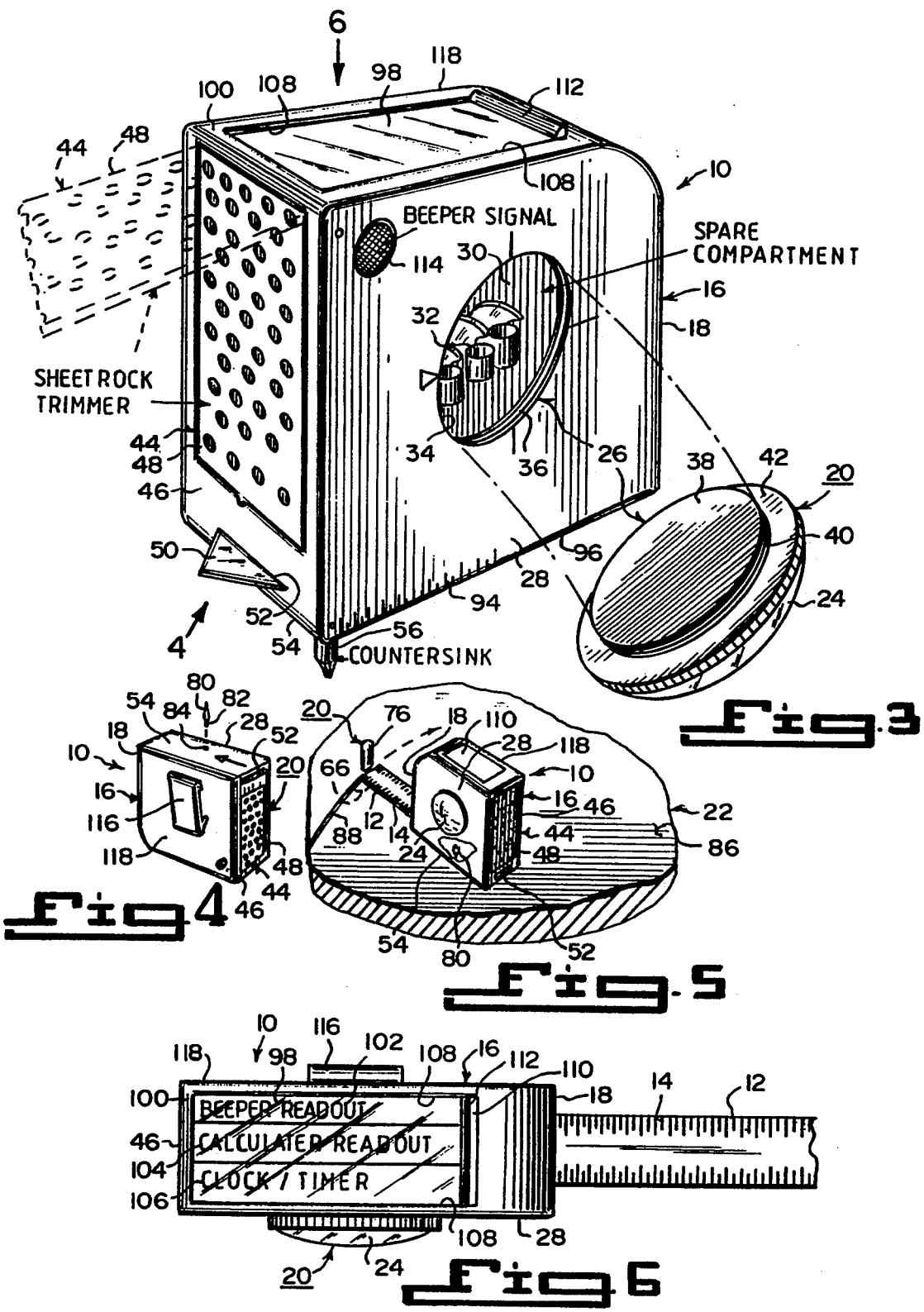

VERSATILE TAPE MEASURE TOOL

BACKGROUND OF THE INVENTION

1. Field of the Invention

The instant invention relates generally to measuring device and more specifically it relates to an improved versatile tape measure tool.

2. Description of the Prior Art

Numerous measuring devices have been provided in prior art that are adapted to be utilized in finding out the extent, size, quantity, capacity, etc. of something by comparison with a standard unit of measure. While these units may be suitable for the particular purpose to which they address, they would not be as suitable for the purposes of the present invention as heretofore described.

SUMMARY OF THE INVENTION

A primary object of the present invention is to provide an improved versatile tape measure tool that will overcome the shortcomings of the prior art devices.

Another object is to provide an improved versatile tape measure tool that contains various components built therein to help a person measure and cut to size plasterboard, so that the plasterboard can be used to cover interior walls and ceilings.

An additional object is to provide an improved versatile tape measure tool that in which some of the various components are electrical units, such as a beeper, calculator and clock/timer, to assist the person when installing the plasterboard to the interior walls and ceilings.

A further object is to provide an improved versatile tape measure tool that is simple and easy to use.

A still further object is to provide an improved versatile tape measure tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view with parts broken away of the instant invention.

FIG. 2 is a front perspective view of a portion of FIG. 1, showing the compass point and pencil sharpener exploded therefrom.

FIG. 3 is a rear perspective view taken in the direction of arrow 3 in FIG. 1, with the level exploded therefrom.

FIG. 4 is an inverted perspective view taken in the direction of arrow 4 in FIG. 3.

FIG. 5 is a perspective view with parts broken away, showing the instant invention making a cut arc into a work piece.

FIG. 6 is a top view taken in the direction of arrow 6 in FIG. 3 with parts broken away.

DETAILED DESCRIPTION OF THE PREFERRED EMBODIMENTS

Turning now descriptively to the drawings, in which similar reference characters denote similar elements throughout the several views, FIGS. 1 through 6 illustrate an improved versatile tape measure tool 10, which consists of an elongated strip of tape 12 marked off in a linear scale 14 for taking measurements. A casing 16 is for storing the tape 12 therein in a coiled spring biased condition, with the tape 12 being extendable through a first end wall 18 of the casing 16 for measuring. A plurality of components 20 are built into the casing 16, to help in the measuring and cutting to size of plasterboard 22, so that the plasterboard 22 can be used to cover interior walls and ceilings.

One of the components 20 includes a circular shaped level 24, to ascertain whether a surface in a first instance is horizontal and in a second instance is vertical. A structure 26 is for attaching the level in a removable manner to a first side wall 28 of the casing 16, thereby forming a compartment 30 within the casing 16 for storing spare parts 32.

The removable attaching structure 26 consists of the casing 16 having a circular hole 34 with internal threads 36 extending through the first side wall 28 thereof. A circular collar 38 with external threads 40 is formed on a rear surface 42 of the level 24, to thread into the circular hole 34 in the first side wall 28 of the casing 16.

One of the components 20 is a trimmer 44, pivotally mounted to a second end wall 46 of the casing 16 for shaving the edges of the plasterboard 22. The trimmer 44 is a perforated rectangular plate 48 having one upper short side hinged to the second end wall 46 of the casing 16.

One of the components 20 is a scoring blade 50, that is adjustable within a track 52 formed into the second end wall 46 adjacent to and parallel with a bottom wall 54 of the casing 16. One of the components 20 is a countersink member 56 pivotally mounted to the bottom wall 54 at a corner of the first side wall 28 and the second end wall 46 of the casing, so that when the countersink member 56 is pivoted downwardly from the bottom wall 54, it will form a depression in the plasterboard 22 for the insertion of a fastener into the plasterboard 22.

One of the components 20 is a roller glide 58 that is rotatable within the first end wall 18 of the casing 16 below the tape 12, to allow the casing 16 to slide along the edges of the plasterboard 22 when measuring with the tape 12. One of the components 20 is a lock and automation rewind switch 60, for the tape 12 on the first end wall 18 of the casing 16. One of the components 20 is a pencil sharpener 62 mounted in a removable manner into a recessed area 64 in the first end wall 80 of the casing 16.

One of the components 20 consists of a curved knife blade 66. A fastener 68 is for attaching the knife blade 66 in a pivotable manner to a distal bent end 70 of the tape 12, with the knife blade 66 in a perpendicular position with respect to the tape 12, when the knife blade 66 is pivoted downwardly, it will cut into the plasterboard 22. A sleeve 72 fits over the knife blade 66. When the knife blade 66 is pivoted upwardly in a non-operable position, the sleeve 72 will cover the knife blade 66 for safety.

One of the components 20 is a holder 74 for a pencil 76 that is affixed to an opposite end of the knife blade 66.

When the knife blade 66 is pivoted upwardly in its nonoperable position, the holder 74 will extend downwardly with the pencil 76, so that the pencil 76 can mark the plasterboard 22. A cap 78 fits over the pencil 76, when the holder 74 is pivoted upward in its nonoperable position, so that the cap 78 will cover the pencil 76 for safety.

One of the components 20 is a compass point 80 having a threaded stud 82 that can be threaded into a central aperture 84 in the bottom wall 54 of the casing 16. The compass point 80 can be inserted into a surface 86 of the plasterboard 22. The casing 16 will pivot on the compass point 80, with the knife blade 66 in a first instance cutting an arch 88 in the surface 86 of the plasterboard 22, as shown in FIG. 5. The pencil 76 in the holder 74 in a second instance can mark an arch on the surface 86 of the plasterboard 22.

The first end wall 18 of the casing 16 has a storage compartment 90 for the compass point 80. A snap on cap 92 fits over the storage compartment 90. A scale 94 is printed on the first side wall 28 along a bottom edge 96 adjacent the countersink member 56, to measure lengths of furring strips.

One of the components 20 is a display window 98 on a top wall 100 of the casing 16, for a beeper readout 102, a calculator readout 104 and a clock/timer readout 106. A track 108 is built into opposite sides of the window 98. A slide cover 110 is provided having a finger grip stop 112. The slide cover 110 can ride in the track 108, to expose and seal the display window 98.

A small speaker 114 is built into the first side wall 28 of the casing 16, for emitting beeper signals when activated. A spring clip 116 is affixed onto a second side wall 118 of the casing 16, so that the spring clip 116 will allow the casing 16 to be worn on a garment.

LIST OF REFERENCE NUMBERS 10 improved versatile tape measure tool
12 tape
14 linear scale on 12
16 casing
18 first end wall of 16
20 component
22 plasterboard
24 circular shaped level
26 attaching structure
28 first side wall of 16
30 compartment
32 spare parts
34 circular hole in 28
36 internal threads in 34
38 circular collar
40 external threads on 38
42 rear surface of 24
44 trimmer
46 second end wall of 16
48 perforated rectangular plate for 44
50 scoring blade
52 track in 46
54 bottom wall of 16
56 countersink member
58 roller glide
60 lock and automatic rewind switch
62 pencil sharpener
64 recessed area in 18
66 curved knife blade
68 fastener
70 distal bent end of 12
72 sleeve for 66
74 holder
76 pencil
78 cap
80 compass point
82 threaded stud on 80
84 central aperture in 54
86 surface of 22
88 cut arch in 86
90 storage compartment in 18
92 snap on cap over 90
94 scale on 28
96 bottom edge of 28
98 display window
100 top wall of 16
102 beeper readout
104 calculator readout
106 clock/timer readout
108 track in 98
110 slide cover
112 finger grip stop
114 small speaker in 28
116 spring clip
118 second side wall of 16

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved versatile tape measure tool which comprises:
   a) an elongated strip of tape marked off in a linear scale for taking measurements;
   b) a casing for storing said tape therein in a coiled spring biased condition with said tape being extendable through a first end wall of said casing for measuring;
   c) a plurality of components built into said casing, to help in the measuring and cutting to size of plasterboard, so that the plasterboard can be used to cover interior walls and ceilings;
   d) wherein one of the components includes a circular shaped level to ascertain whether a surface in a first instance is horizontal and in a second instance is vertical;
   e) means for attaching said level in a removable manner to a first side wall of said casing, thereby forming a compartment within said casing for storing spare part;

f) wherein said removable attaching means includes said casing having a circular hole with internal threads extending through the first side thereof;

g) a circular collar with external threads formed on a rear surface of said level to thread into said circular hole in the first side wall of said casing;

h) wherein a second of said components includes a trimmer pivotally mounted to a second end wall of said casing for shaving the edges of the plasterboard;

i) wherein said trimmer is a perforated rectangular plate having one upper short side hinged to the second end wall of said casing.

2. An improved versatile tape measure tool as recited in claim 5, wherein one of said components includes a scoring blade that is adjustable within a track formed into the second end wall adjacent to and parallel with a bottom wall of said casing.

3. An improved versatile tape measure tool as recited in claim 2, wherein one of said components is a countersink member pivotally mounted to the bottom wall at a corner of the first side wall and the second end wall of the casing, so that when said countersink member is pivoted downwardly from the bottom wall, it will form a depression in the plasterboard for the insertion of a fastener into the plasterboard.

4. An improved versatile tape measure tool as recited in claim 3, wherein one of said components includes a roller glide that is rotatable within the first end wall of said casing below said tape, to allow said casing to slide along the edges of the plasterboard when measuring with said tape.

5. An improved versatile tape measure tool as recited in claim 4, wherein one of said components is a lock and automatic rewind switch for said tape on the first end wall of said casing.

6. An improved versatile tape measure tool as recited in claim 5, wherein one of said components is a pencil sharpener mounted in a removable manner into a recessed area in the first end wall of said casing.

7. An improved versatile tape measure tool as recited in claim 6, wherein one of said components includes:

a) a curved knife blade;

b) a fastener for attaching said knife blade in a pivotable manner to a distal bent end of said tape, with said knife blade in a perpendicular position with respect to said tape, so that when said knife blade is pivoted downwardly it will cut into the plasterboard; and c) a sleeve to fit over said knife blade, so that when said knife blade is pivoted upwardly in a non-operable position, said sleeve will cover said knife blade for safety.

8. An improved versatile tape measure tool as recited in claim 7, wherein one of said components includes:

a) a holder for a pencil affixed to an opposite end of said knife blade, so that when said knife blade is pivoted upwardly in its non-operable position, said holder will extend downwardly with the pencil, so that the pencil can mark the plasterboard; and b) a cap to fit over the pencil when said holder is pivoted upward in its non-operable position, so that said cap will cover the pencil for safety.

9. An improved versatile tape measure tool as recited in claim 8, wherein one of said components is a compass point having a threaded stud that can be threaded into a central aperture in the bottom wall of said casing, whereby said compass point can be inserted into a surface of the plasterboard allowing said casing to pivot on said compass point with said knife blade in a first instance cutting an arch in the surface of the plasterboard, and the pencil in said holder in a second instance marking an arch on the surface of the plasterboard.

10. An improved versatile tape measure tool as recited in claim 9, further including:

a) the first end wall of said casing having a storage compartment for said compass point; and b) a snap on cap to fit over said storage compartment.

11. An improved versatile tape measure tool as recited in claim 10, further including a scale printed on the first side wall along a bottom edge adjacent said countersink member to measure lengths of furring strips.

* * * * *